US008443948B2

(12) United States Patent
Rottenberger et al.

(10) Patent No.: US 8,443,948 B2
(45) Date of Patent: May 21, 2013

(54) VIBRATION DAMPER WITH STROKE-DEPENDENT DAMPING FORCE

(75) Inventors: Theo Rottenberger, Burkardroth (DE); Rainer Kirchner, Poppenhausen (DE); Rainer Barnickel, Wilhelmsthal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 712 days.

(21) Appl. No.: 12/625,065

(22) Filed: Nov. 24, 2009

(65) Prior Publication Data

US 2010/0126812 A1 May 27, 2010

(30) Foreign Application Priority Data

Nov. 26, 2008 (DE) ......................... 10 2008 044 081

(51) Int. Cl.
*F16F 9/48* (2006.01)

(52) U.S. Cl.
USPC ...................................... 188/287; 188/322.19

(58) Field of Classification Search
USPC ..................... 188/286, 287, 314, 313, 322.19
See application file for complete search history.

(56) References Cited

U.S. PATENT DOCUMENTS

| | | | | |
|---|---|---|---|---|
| 1,575,973 | A | 3/1926 | Coleman | |
| 3,307,842 | A * | 3/1967 | Ellis, Jr. | 267/128 |
| 3,340,965 | A * | 9/1967 | Ellis, Jr. | 188/287 |
| 5,178,239 | A | 1/1993 | Homme | |
| 7,191,877 | B2 | 3/2007 | Norgaard et al. | |

FOREIGN PATENT DOCUMENTS

| | | |
|---|---|---|
| DE | 600 22 350 | 6/1999 |
| DE | 199 53 372 | 8/2000 |
| DE | 10 2006 049 298 | 5/2007 |
| JP | 2006 097 880 | 4/2006 |

* cited by examiner

*Primary Examiner* — Melanie Torres Williams
(74) *Attorney, Agent, or Firm* — Cozen O'Connor

(57) ABSTRACT

A vibration damper including a cylinder in which a displacer carries out a translational movement. The displacer has a work piston which divides the cylinder into two work spaces. The work spaces outside the displacer for each operating movement direction of the displacer are connected to damping valves by a flow connection. Every flow connection has only one flow direction through a check valve arrangement. The flow connection has a plurality of inflow ports which are offset in axial direction starting from the work spaces and is formed by a bypass channel, and a plurality of damping valves are connected to the bypass channel and admit damping medium via the inflow ports.

11 Claims, 4 Drawing Sheets

VIBRATION DAMPER WITH STROKE-DEPENDENT DAMPING FORCE

BACKGROUND OF THE INVENTION

1. Field of the Invention

The invention is directed to a vibration damper with stroke-dependent damping force.

2. Description of the Related Art

A vibration damper with stroke-dependent damping force comprising a cylinder in which a displacer carries out a translational movement is known from U.S. Pat. No. 7,191,877 B2. The displacer has a work piston which divides the cylinder into two work spaces. The work spaces outside the displacer, for each operating movement direction of the displacer, are connected to damping valves by a flow connection. Every flow connection has only one flow direction through a check valve arrangement. The flow connection has a plurality of inflow ports which are offset in axial direction starting from the work spaces. A plurality of bypass channels form the flow connection for an operating movement of the displacer. An individual damping valve is arranged in each bypass channel. The example described with reference to FIG. 5 in U.S. Pat. No. 7,191,877 B2 comprises four bypass channels so that two damping valve can be used for each movement direction and, therefore, a maximum of three stroke-dependent damping force characteristics are available for each movement direction.

To achieve additional damping force characteristics, i.e., a more precisely stepped stroke-dependent damping force adjustment, another bypass channel must be provided. It can be seen from FIGS. 5 and 6 that there is no available installation space provided at the outer surface of the cylinder. Further, there is a smaller proportion of the surface area for cooling fins.

SUMMARY OF THE INVENTION

It is an object of the present invention to overcome the disadvantages described in the prior art with respect to installation space.

According to one embodiment of the invention, this object is met in that the flow connection is formed by a bypass channel and a plurality of damping valves are connected to the bypass channel which admit damping medium via inflow ports.

The problem relating to installation space can be overcome by bundling a plurality of damping valves at a bypass channel.

In another advantageous embodiment, an individual bypass channel is provided for each movement direction of the displacer. Accordingly, the installation space requirement in circumferential direction of the cylinder is not dependent upon the quantity of damping valves used.

With respect to a simple manufacture of the vibration damper, a plurality of damping valves are arranged in a common housing, this housing having a fluid connection to the bypass channel.

A self-closing check valve is arranged in the fluid connection for every damping valve in the flow direction to the damping valve. This prevents short-circuiting of the flow paths in the vibration damper.

For reasons relating to installation space and to simplify assembly, the damping valve and the associated check valve form a structural unit.

The damping valves for both movement directions of the displacer are arranged in a common housing. This step takes even greater advantage of the existing installation space.

The bypass channel advantageously has an individual outflow port to an adjoining work space.

In one embodiment, the housing is connected by an outer surface of the cylinder, and the longitudinal axes of the damping valves extend radial to the longitudinal axis of the cylinder.

The production of the vibration damper is facilitated in that the damping valves can be installed by an outer top side of the housing. The inflow ports into the work spaces can be produced via the top side of the housing.

As an additional measure for adapting the damping characteristics of the vibration damper, at least one of the damping valves is adjustable with respect to its damping force characteristic.

According to one embodiment, the housing and the associated bypass channel are connected to the cylinder so as to be offset in circumferential direction. In this way, the radial installation space requirement is smaller than if the housing and the bypass channel were arranged radially on a line.

For technical reasons relating to manufacture, it is advantageous when the housing is formed by a web connected to the cylinder.

In a further development, the housing is constructed integral with the cylinder in that the cylinder is constructed as an extruded part comprising the outer web.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
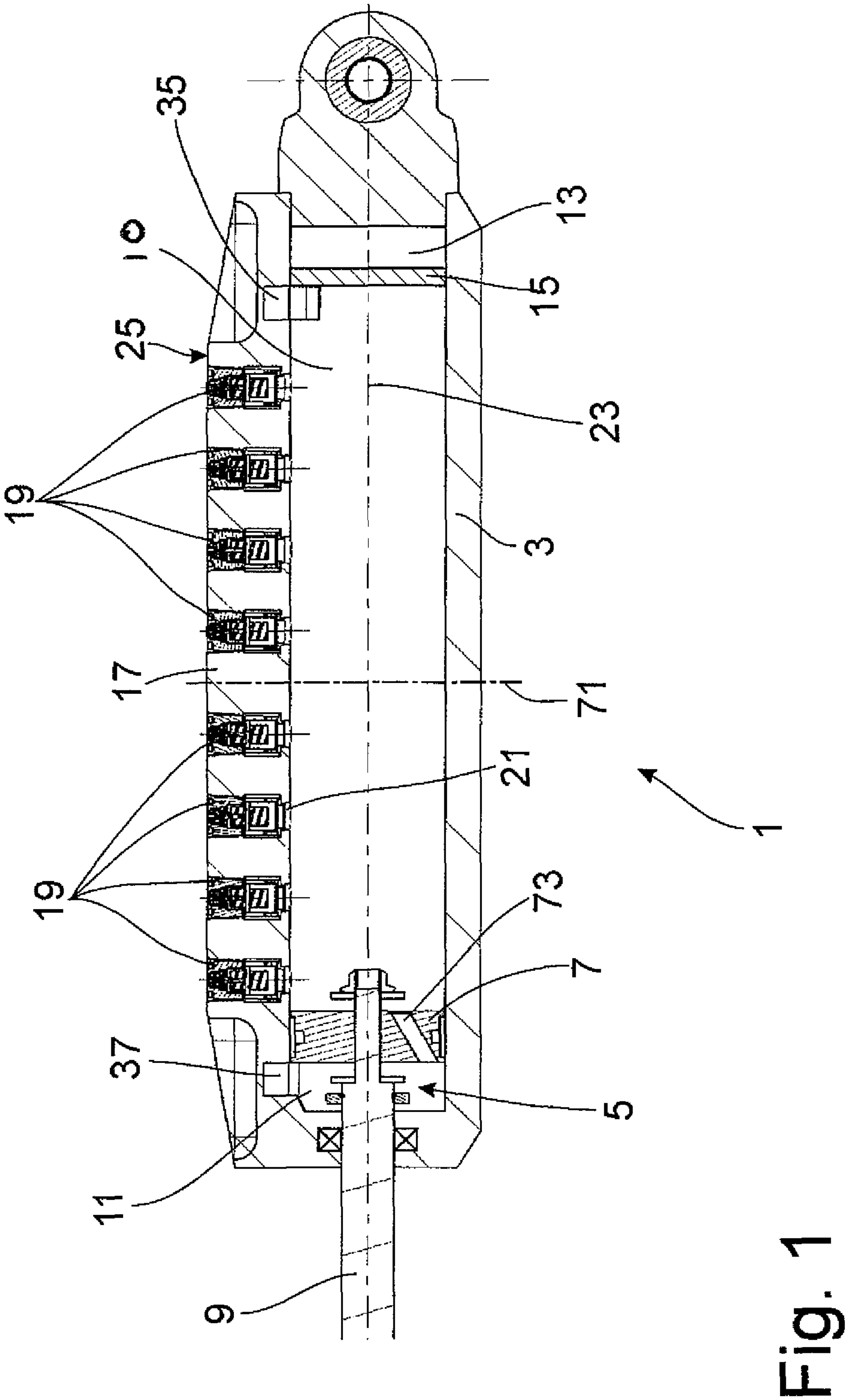
FIG. 1 is a vibration damper in longitudinal section.

FIG. 1 shows a vibration damper 1 with a cylinder 3 in which a displacer 5 carries out a translational movement. The displacer comprises a piston 7 affixed to a piston rod 9. The piston 7 divides the cylinder 3 into a work space 10 remote of the piston rod and a work space 11 proximal to the piston rod. Both work spaces 10 and 11 are filled with a damping medium. In this embodiment, the vibration damper 1 comprises a compensating space 13 arranged at the end and which compensates for the volume displaced by the piston rod 9. An axially movable sealing and separating member 15 or, alternatively, a diaphragm is arranged between the compensating space and the work space 10 remote of the piston rod. A housing 17 is constructed integral with the cylinder 3. A plurality of damping valves 19 ensure a stroke-dependent damping force characteristic of the vibration damper 1 are arranged in the housing 17. The damping valves 19 are connected to one of the work spaces 10 and 11 by inflow ports 21. The housing 17 for the damping valves 19 is connected along an outer surface of the cylinder 3, and the longitudinal axes of the damping valves 19 extend radial to the longitudinal axis 23 of the cylinder 3. Accordingly, the damping valves 19 can be installed over an outer top side 25 of the housing 17.

Figure 3:
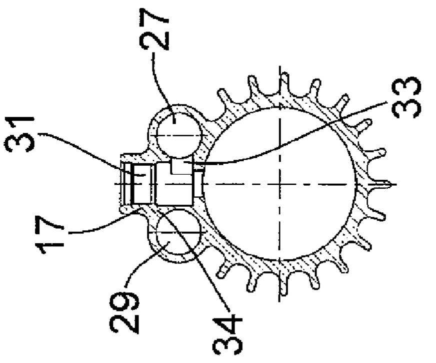
FIG. 3 is the cylinder of FIG. 2 in cross section along plane
Figure 2:
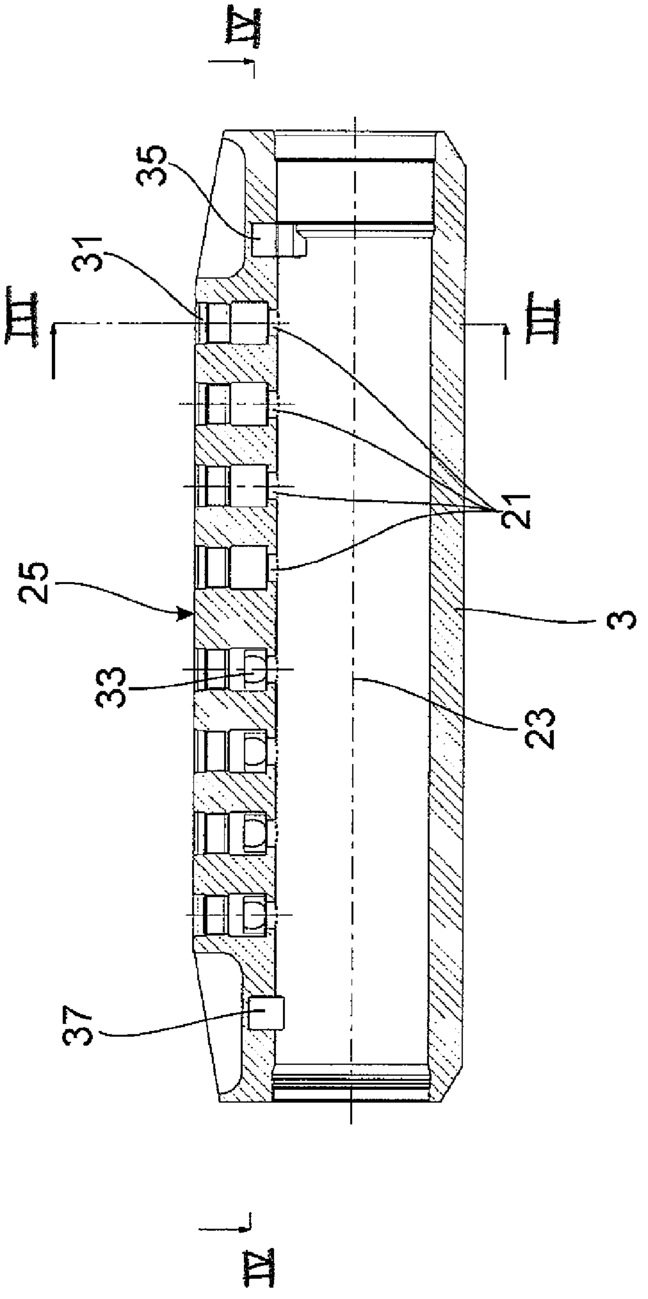
FIG. 2 is a cylinder of the vibration damper as an individual part in longitudinal section.

As can be seen from FIGS. 2 and 3, a plurality of damping valves are arranged in damping valve receptacles 31 in a common housing 17. The housing 17 extends axially parallel to the longitudinal axis of the cylinder 3. Similarly, two bypass channels 27, 29 extend parallel to the longitudinal axis 23 of the cylinder. Each damping valve receptacle 31 is connected to only one of the bypass channels 27, 29 by a separate fluid connection 33. FIG. 3 shows that the housing 17 and the bypass channels 27, 29 are connected to the cylinder 3 so as to be offset in circumferential direction. The housing 17 is formed by a web 34 connected to the cylinder 3. The cylinder 3 has at least one outflow port 35, 37 for each work space and bypass channel. The inflow ports 21 in the cylinder 3 in connection with the damping valves 19, fluid connections 33, bypass channels 27, 29 and outflow ports 35, 37 form flow connections between the two work spaces 9 and 11. As can be seen, the flow connections run outside the displacer 5. In this embodiment, only one individual bypass channel 27, 29 is constructed for each movement direction of the displacer 5. In principle, a plurality of bypass channels can also be provided for one movement direction, e.g., when the installation space for the valve receptacles is larger than the desired distance between two steps of the damping force characteristic. Two bypass channels can then be hydraulically connected in parallel and a greater quantity of damping valves can be arranged on a given stroke length.

Figures 4, 5, 6:
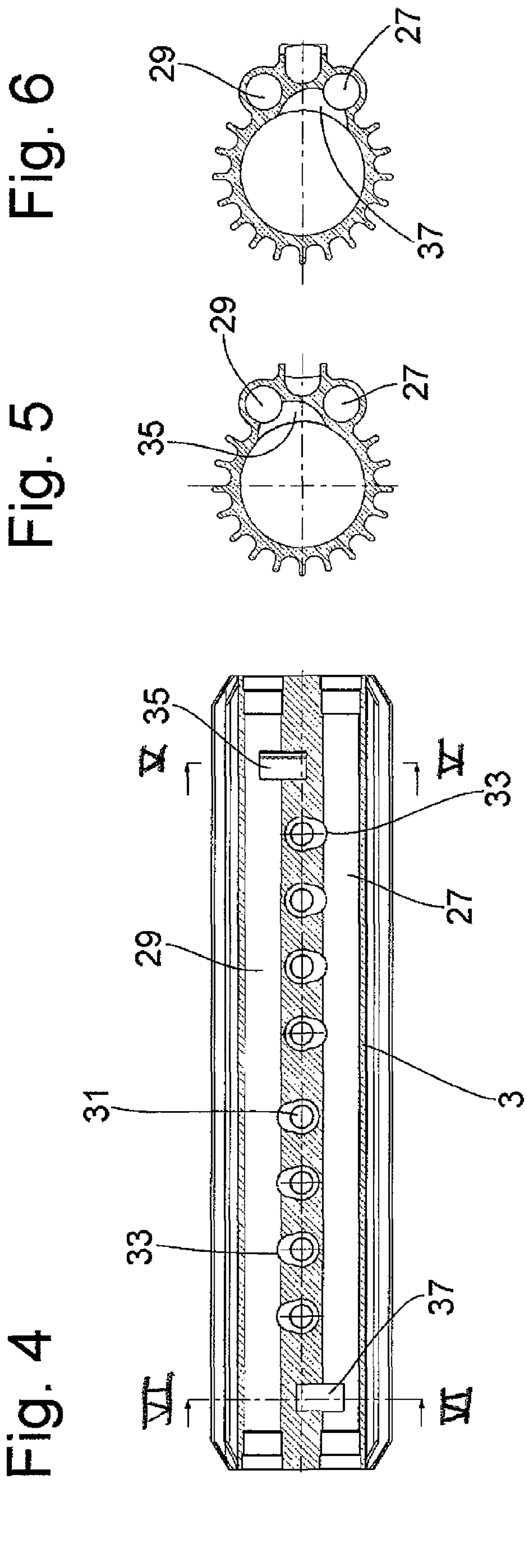
FIG. 4 is a section through the cylinder of FIG. 2 according to plane IV-IV.
FIG. 5 is a cross section through the cylinder of FIG. 4 according to section plane V-V.
FIG. 6 is a cross section through the cylinder of FIG. 4 according to plane VI-VI.

Reference is made to FIGS. 4 to 6 for a better understanding of the flow connection. FIG. 4 shows a vertical section through the cylinder 3 in the area of the bypass channels 27, 29 and housing 17. Eight damping valve receptacles 31 are shown; four of the damping valve receptacles 31 are connected to the bypass channel 27 by fluid connections 33, and the other four of the damping valve receptacles 31 are connected to bypass channel 29 by a fluid connection 33. The bypass channel is in turn connected to the outflow port 37 which opens into the work space 11 (FIG. 1). Bypass channel 29 opens into the work space 10 (FIG. 1) remote of the piston rod via outflow port 35.

Figure 7:
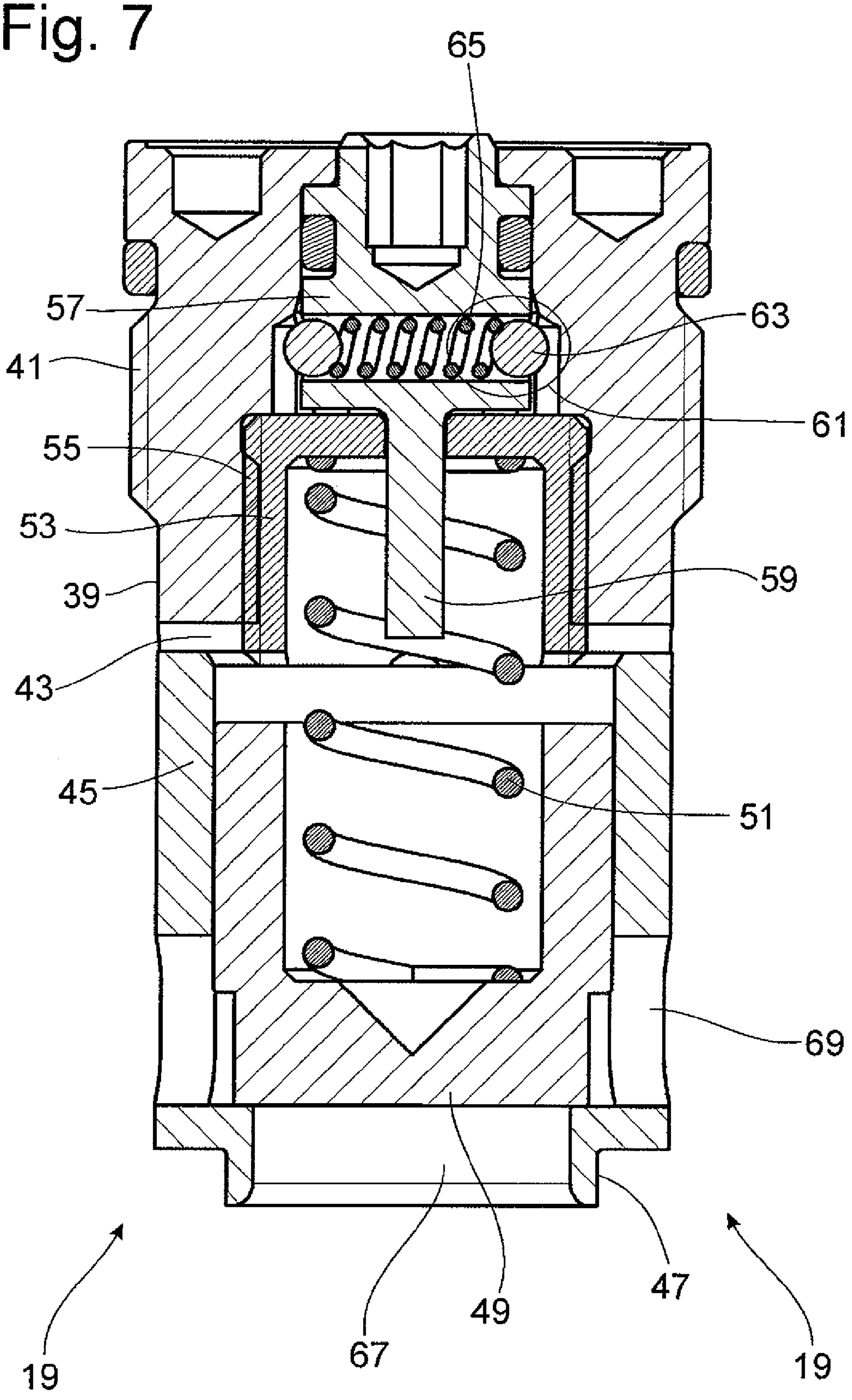
FIG. 7 is a section through a damping valve.

FIG. 7 shows a damping valve 19 as an individual part. The damping valve 19 is adjustable with respect to its damping force characteristic and comprises a top part 39 of the valve housing which has a screw-in thread 41 on its outer surface for fastening in one of the damping valve receptacles 31. The top part 39 of the valve housing is connected to a bottom part 45 of the valve housing by a positive-engagement screw transmission connection 43. The bottom part 45 of the valve housing comprises a shoulder 47, which is inserted into the inflow port 21 of the damping valve receptacle 31. A valve body 49 is supported so as to be axially displaceable against a valve spring 51 in the bottom part 45 of the valve housing. The valve spring 51 is supported at a spring seat 53 in the top part 39 of the valve housing. A movement thread 55 is formed between the spring seat 53 and an inner wall of the top part of the valve housing. The rotational movement of a rotary actuator 57 which is rotatable relative to the top part 39 of the valve housing can be converted into an axial movement of the spring seat 53 by the rotary actuator 57 with the intermediary of a transmission pin 59 in order to adapt the pretensioning of the valve spring 51 to a desired damping force characteristic. A lock 61 between the rotary actuator 57 and the top part 39 of the valve housing in the form of balls 63 which are pretensioned radially outward by a spring 65 afford the possibility of a reproducible adjustment of the desired damping force characteristic.

The damping valve according to FIG. 7 is constructed as a seat valve and allows flow in only one direction, namely, via an intake port 67 in the shoulder 47. There is no possibility of flow through a fluid connection opening 69 because the valve body 49 is moved into the closed position due to the pretensioning of the valve spring 51, and the pressure in the fluid connection cannot exert an opening force so that the valve body forms a check valve for this inflow direction. Accordingly, in conjunction with the valve spring 51, the damping valve 19 and valve body 49 form a damping valve and an associated check valve as a structural unit.

During inward movement of the displacer 5 in a direction of the work space 9 over a level position 71, indicated by a dash-dot transverse axis, in FIG. 1, there are, for example, four damping valves 19 available in addition to a valve device 73 in the piston 7, these four damping valves 19 are connected in parallel in this particular level position 71. The displaced damping medium can flow through all four damping valves via the fluid connections 33 into the bypass channel 27 and, further, via the outflow port 37 into the work space 11 proximal to the piston rod. Therefore, until reaching level position 71, the vibration damper has the lowest possible damping force in relation to a given piston rod speed. While the damping medium can flow out of the work space 9 remote of the piston rod and the outflow port 35 into the bypass channel 29, the check valve functions of the damping valves 19, which are connected to the bypass channel 29, prevent a short circuiting of the damping valves 19. As the moved-in position increases, the quantity of valves which can occupy a through-flow position between the underside of the piston 7 and the outflow port 35 decreases so that fewer and fewer damping valves 19 are available as the inward movement increases and, consequently, the damping force must increase at a constant displaced volume. The compensating space 13 admits the volume of the damping medium displaced by the piston rod 19. During an outward movement of the piston rod 9 beyond level position 71, the damping valves 19 to the left of the level position 71 shown in the drawing are active. A short circuiting via the outflow port 37 is likewise impossible because even though the damping medium is present at the four damping valves 19 on the right-hand side via the bypass channel 27 and the fluid connection 33, the check valve function in the direction of the damping valves starting from the fluid connections prevents damping medium from simply flowing around the damping valves 19 to the left of level position 71 referring to the drawing.

By grouping all of the damping valves 19 in an individual housing and combining all of the damping valves 19 for one movement direction at an individual bypass channel, a very compact vibration damper can be achieved.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:

a cylinder having a first end and a second end and a plurality of inflow ports offset in an axial direction between the first and second ends;

a displacer configured for translational movement in the cylinder;

a work piston coupled to the displacer, the piston dividing the cylinder into two work spaces;

a first bypass channel configured for movement of the displacer in a first direction substantially parallel to the cylinder, the first bypass channel having a plurality of fluid connections corresponding to a first set of the plural inflow ports;

a second bypass channel configured for movement of the displacer in a second direction opposite the first direction substantially parallel to the cylinder, the second bypass channel having a plurality of fluid connections corresponding to a second set of the plural inflow ports; and a damping valve having a check valve arrangement arranged in each of the plural inflow ports, the plural damping valves configured for fluidic connection between one of the two work spaces and one of the first and second bypass channels, wherein the plural damping valves are arranged in a common housing, the housing having a fluid connection to at least one of the first and second bypass channels.

2. The vibration damper according to claim 1, wherein the check valve arrangement of each of the plural damping valves is a self-closing check valve.

3. The vibration damper according to claim 2, wherein the damping valve and the associated check valve form a structural unit.

4. The vibration damper according to claim 1, wherein the plural damping valves for both movement directions of the displacer are arranged in a common housing.

5. The vibration damper according to claim 1, wherein the first bypass channel has an output arranged proximate to the first end; and the second bypass channel has an output arranged proximate to the second end.

6. The vibration damper according to claim 1, wherein the housing is connected by an outer surface of the cylinder, and longitudinal axes of the plural damping valves extend radially with respect to a longitudinal axis of the cylinder.

7. The vibration damper according to claim 6, wherein the damping valves are configured to be installed from an outer side of the housing.

8. The vibration damper according to claim 1, wherein at least one of the plural damping valves is adjustable with respect to its damping force characteristic.

9. The vibration damper according to claim 1, wherein the housing and the at least one of the first and second bypass channels are connected to the cylinder in a circumferentially offset direction.

10. The vibration damper according to claim 6, wherein the housing is formed by a web connected to the cylinder.

11. The vibration damper according to claim 1, wherein the housing is formed integrally with the cylinder.

* * * * *